United States Patent
Raemy et al.

(10) Patent No.: US 10,627,196 B2
(45) Date of Patent: Apr. 21, 2020

(54) METHOD AND DEVICE FOR MARKING AMMUNITION FOR IDENTIFICATION OR TRACKING

(71) Applicant: SICPA HOLDING SA, Prilly (CH)

(72) Inventors: Xavier Cedric Raemy, Belmont-sur-Lausanne (CH); Milan Vasic, Geneva (CH)

(73) Assignee: SICPA HOLDING SA, Prilly (CH)

( * ) Notice: Subject to any disclaimer, the term of this patent is extended or adjusted under 35 U.S.C. 154(b) by 165 days.

(21) Appl. No.: 15/023,910

(22) PCT Filed: Sep. 23, 2014

(86) PCT No.: PCT/EP2014/070218
§ 371 (c)(1),
(2) Date: Mar. 22, 2016

(87) PCT Pub. No.: WO2015/040237
PCT Pub. Date: Mar. 26, 2015

(65) Prior Publication Data
US 2016/0216087 A1      Jul. 28, 2016

Related U.S. Application Data

(60) Provisional application No. 61/881,165, filed on Sep. 23, 2013.

(51) Int. Cl.
*F42B 5/02*      (2006.01)
*B26D 3/08*      (2006.01)
(Continued)

(52) U.S. Cl.
CPC ................ *F42B 5/025* (2013.01); *B26D 3/08* (2013.01); *B26D 5/005* (2013.01); *F42B 35/00* (2013.01); *G05B 15/02* (2013.01)

(58) Field of Classification Search
CPC . B26D 3/08; B26D 5/005; F42B 35/00; F42B 5/025; G05B 15/02
See application file for complete search history.

(56) References Cited

U.S. PATENT DOCUMENTS

| 1,632,156 A | 6/1927 | Wiley |
| 5,097,615 A * | 3/1992 | Kearns .................... F41C 9/085 42/90 |

(Continued)

FOREIGN PATENT DOCUMENTS

| DE | 3830903 | 3/1990 |
| DE | 20008517 | 10/2000 |

(Continued)

OTHER PUBLICATIONS

Russian office action and Search Report in counterpart Russian Application No. 2016112350 dated May 18, 2018 (and English language translation of Relevant Excerpt).

*Primary Examiner* — Chad G Erdman
(74) *Attorney, Agent, or Firm* — Muncy, Geissler, Olds & Lowe, P.C.

(57) ABSTRACT

The present invention describes a method of providing a mark to a case (13) of a cartridge (1) of ammunition. The mark comprises at least one sub-mark (12) and is suitable for identification or for tracking of the cartridge (1). According to the present invention, at least one scratching means (10) selectively incises a surface of the case (13), thereby forming the at least one sub-mark (12).

12 Claims, 1 Drawing Sheet

(51) Int. Cl.
*B26D 5/00* (2006.01)
*G05B 15/02* (2006.01)
*F42B 35/00* (2006.01)

(56) References Cited

U.S. PATENT DOCUMENTS

| | | | | |
|---|---|---|---|---|
| 6,327,791 | B1* | 12/2001 | Norcross | F15B 15/2846 |
| | | | | 33/706 |
| 7,823,495 | B2 | 11/2010 | Martini Filho | |
| 9,109,866 | B2* | 8/2015 | Newman | F42B 33/14 |
| 2003/0014895 | A1 | 1/2003 | Lizotte et al. | |
| 2004/0027630 | A1* | 2/2004 | Lizotte | B23K 26/04 |
| | | | | 359/15 |
| 2004/0049965 | A1* | 3/2004 | Breiner | F41A 21/00 |
| | | | | 42/76.1 |
| 2004/0232234 | A1* | 11/2004 | Zvezdine | G01D 5/145 |
| | | | | 235/449 |
| 2005/0241203 | A1* | 11/2005 | Lizotte | F41A 21/12 |
| | | | | 42/1.01 |
| 2006/0027132 | A1* | 2/2006 | Libra | F42B 12/06 |
| | | | | 102/522 |
| 2007/0084316 | A1* | 4/2007 | Trice | B23B 27/06 |
| | | | | 82/1.11 |
| 2008/0184873 | A1 | 8/2008 | Martin et al. | |
| 2013/0084780 | A1* | 4/2013 | Lancaster-Larocque | |
| | | | | B24B 49/12 |
| | | | | 451/5 |
| 2016/0201220 | A1* | 7/2016 | Li | C30B 33/00 |
| | | | | 428/81 |
| 2016/0257132 | A1* | 9/2016 | Raemy | F42B 5/025 |

FOREIGN PATENT DOCUMENTS

RU 2213932 10/2003
RU 2363906 8/2009

\* cited by examiner

METHOD AND DEVICE FOR MARKING AMMUNITION FOR IDENTIFICATION OR TRACKING

TECHNICAL FIELD

The present invention relates to the field of marking of ammunition. In particular, the invention relates to a method of providing a mark to a case of a cartridge of ammunition, wherein the mark comprises at least one sub-mark and is suitable for identification or for tracking of the cartridge. Further, the invention relates to a device for providing such a mark to a cartridge of ammunition.

BACKGROUND

Ammunition marking is an important tool for tracking of ammunition as well as for controlling the use of it. Further, it can be used for quality assurance and for ensuring proper use of ammunition by clearly identifying the sort of ammunition, in particular its type and caliber. In connection with the use of ammunition by military and law enforcement forces, marking of ammunition is important for stock pile management, transportation and record keeping. Particularly in the civil sector, marking ammunition potentially helps investigating crimes in which firearms are involved.

It is common that marks in the form of a stamp are applied to the bottom of a cartridge, also called round, of ammunition. However, due to the limited space available on the bottom of a cartridge, the amount of information which can be applied to the cartridge via such a marking is also very limited. There are techniques of applying a mark also to the lateral outer surface of a cartridge case. Marking the lateral outer surface of a cartridge case is, today, achieved by use of printing techniques. The usual technique of stamping, as it is applied to the bottom of the case of the cartridge, is much less suitable for application to the case of a cartridge since this would easily damage the case in its lateral or radial direction. Thus, press stamping is not used for marking the lateral surface of the case.

It is known from U.S. Pat. No. 7,823,495 B2 to use laser engraving techniques for engraving the surface of a cartridge, in particular an extractor groove which is typically placed in the area near the bottom of the case. A particular drawback of this method is that the equipment needed for laser engraving is very complex and, thus, expensive which is a decisive disadvantage for any manufacturer who wants to use the laser engraving method for marking cartridges of ammunition.

Other known techniques, namely press stamping and silk screen or similar printing techniques, have other disadvantages. As to the press stamping, in addition to the fact that this method cannot be applied to the lateral surface of a case of a cartridge, the costs for producing press stamping dies are also significant, similar to the laser engraving equipment. As to the printing techniques, the marks provided by these techniques tend to lose their readability after the cartridge has been fired and can easily be counterfeited.

Accordingly, there is a need for a less expensive method for marking ammunition which is capable of applying marks also to the lateral surface of an ammunition cartridge case so as to increase the maximum amount of information provided by the mark.

SUMMARY

It is an object of the present invention to provide a method and a device which allow for efficiently marking ammunition by a durable and reliable mark which cannot easily be removed.

This problem is solved by the method according to claim 1 and the device according to claim 11, respectively. Further preferred features of the method or device are recited in the dependent claims and detailed in the following description.

DESCRIPTION

Throughout this text, the cartridge of ammunition is also referred to as a round of ammunition. The inventive method of providing a mark to a case of a cartridge of ammunition, or to a round of ammunition, the mark comprising at least one sub-mark and being suitable for identification or for tracking of the cartridge, makes use of at least one scratching means which selectively incises a surface of the case, thereby forming the at least one sub-mark. The means is preferably present in the form of a finger, but the form of the embodiment for the scratching means can be chosen depending on the space available next to the cartridge or round of ammunition.

A cartridge or round of ammunition usually comprises a case, a primer, a propellant and, optionally, one or more projectiles. The propellant usually is a chemical composition to be ignited by the primer which then explodes and generates high pressure which can be used to propel a projectile. Common names for propellants are "powder", "gunpowder", "smoke-less powder" and "black powder". In order to ignite the propellant, the cartridge usually comprises the primer which, upon impact of a firing pin, ignites the propellant. The primer can be provided with a separate casing enclosing a priming mixture. Further, at least the propellant, usually also the primer and, optionally, also a projectile are at least partially enclosed in a case at least part of which forms at least part of an outer surface of the cartridge or round. If a projectile is provided, the projectile usually is at least partially enclosed in the case on the side of the propellant opposite to the primer. Projectiles are, however, not essential or required.

The case usually is cylindrical, conical or bottle-shaped and has an axis of symmetry defining longitudinal, radial and circumferential directions. In the longitudinal direction which is parallel to the axis of symmetry, the propellant usually is located between a primer and a projectile or several projectiles. Radially, i.e. perpendicular to the axis of symmetry, the case usually forms the outer surface of the cartridge.

Most cartridges further have an extraction groove in the case. This is usually applied to the case in the vicinity of a bottom of the case.

The mark to be applied to the case is meant to identify a cartridge. The mark can be used for example to individually identify a specific piece of ammunition or to more generally identify its type, such as its caliber. For example, the mark can be a, possibly encoded, lot number or a serial number of the cartridge. Hence, the mark in the present context is not merely an accidental or random mark on the surface of a case but an intentionally applied mark which can have the form of alphanumeric characters but also of other shapes, preferably lines so as to form a barcode or similar.

At least one scratching means is used to selectively incise a surface of a case to thereby form the at least one sub-mark. Incising the surface means that the scratching means cuts into the surface of the case, thereby removing material from the case, in order to form a groove into the case, or deforming the surface of the case accordingly.

In contrast to the prior art according to U.S. Pat. No. 7,823,495 B2, it is not necessary for the present invention to use expensive laser equipment for engraving a surface of the case of the cartridge. Further, if compared with press stamping techniques, it is possible to use the scratching means to also incise the lateral surface of the case of the cartridge which is not possible by use of the press stamping technique. This is, because, in contrast to any stamping technique, the scratching means does not apply a significant force to the case which would result in deforming the case. Rather, the scratching means merely applies a moderate force to a very limited area of the surface of the case. On the one hand, this moderate force is enough for applying a mark which is not removable from the case. On the other hand, it is not sufficient to deform the shape of the case.

Accordingly, the inventive method allows the application of marks to substantially every surface of the case of the cartridge of ammunition in an inexpensive way. The marks thus applied are not more easily removable or less durable than marks resulting from press stamping, laser engraving or printing.

Preferably, the mark comprises a plurality of sub-marks. By using a plurality of sub-marks it is possible to encode relatively complex information on the surface of the case. An example for a mark having a plurality of sub-marks is a barcode consisting of several lines of different thicknesses. Another example is an alphanumeric code consisting of several alphanumeric characters.

In a preferred embodiment, the sub-mark is at least one of a line, a spot, a scratch and a hole. The sub-mark preferably has a depth in a thickness direction of the case of at most half the thickness of the case at the position of the sub-mark. A preferred minimum depth of the sub-mark would be required for the sub-mark to be effectively protected against wear or intentional removal of the sub-mark by an unauthorized person. A preferred minimum depth of the sub-mark is about 10% of the thickness of the case. Here, the thickness of the case means the thickness of the material, typically a metal, which radially and circumferentially encloses e.g. the propellant.

It is further preferred that the sub-mark extends longitudinally along the casing or circumferentially around the casing. Thus, the sub-mark is particularly easy to a apply to the case because it extends in a direction which allows the scratching means to be longitudinally moved along or circumferentially around the case, or the case to be moved along its longitudinal direction in relation to the scratching means or be rotated about its longitudinal symmetry axis to thereby induce a relative circumferential countermovement of the scratching means relative to the case.

Preferably, the mark provides information on the basis of at least one of an absolute position of the at least one sub-mark on the case, a relative position of the at least one sub-mark with respect to at least one further sub-mark, the existence or non-existence of the at least one sub-mark at a predetermined position, a depth of the at least one sub-mark on the case, a width of the at least one sub-mark and a modulation in depth or width of the at least one sub-mark along its principle extension.

All of the above-mentioned features of the sub-mark can be used for encoding or decoding of information applied to the case via the sub-marks. The absolute position of the sub-mark is meant to be the position of the sub-mark in relation to the case as opposed to a relative position in relation to other sub-marks on the case. The depth and width of the sub-mark can be detected by a respective detector, as can the modulation in depth or width of the at least one sub-mark. This modulation is preferably applied along the principle extension of the sub-mark. In this respect, the principle extension of the sub-mark is, for example for a sub-mark being line-shaped, the length of the line rather than its thickness, similarly for other shapes of sub-marks, a principal extension can be defined along which a modulation in depth or width or both can be provided.

In a preferred embodiment, the mark has the form of a standard barcode. Barcodes are widely used for encoding information to be read by a barcode scanner. A plurality of lines of different thicknesses and relative distances can be considered to be a barcode according to this preferred embodiment. A suitable detector can detect the mark and read or decrypt the barcode.

In a preferred embodiment, the at least one scratching means comprises a material which is harder than a material of the case. It is preferred that the scratching means is harder than the material of the case to ensure that the sub-marks are reliably incised in the surface of the case. A possible material for the scratching means would, therefore, be diamond, diamond-like carbon or similar materials. Alternatively, it is possible that the scratching means is made of a metal or an alloy which preferably is harder than the material of the case.

In a preferred embodiment, the at least one scratching means is moved by an actuator from an idle position to an active position for incising the surface of the case. Using such an actuator allows to very precisely mark the case.

Further preferably, the active position of the scratching means is variable and the depth of the at least one sub-mark on the case can be modulated by varying the active position of the scratching means. Varying the depth of the sub-mark can be recognized as a varying contrast of the sub-mark and the surface of the case. It increases the degrees of freedom for encrypting information via the mark on the case.

The variable active position of the scratching means can be understood to mean a plurality of active positions or a continuously variable active position which can be controlled by the actuator. In any case, the amount and density of information which can be applied to the cartridge can be significantly increased.

In a preferred embodiment, a plurality of scratching means selectively incises the case. If the plurality of scratching means is used, the method for marking the case can be made more efficient because several marks can simultaneously be applied to the case.

Further preferably, a computer system controls the at least one scratching means, preferably the plurality of scratching means, and a position of the cartridge in order to generate a predetermined mark on the cartridge in accordance with the above mentioned methods.

A device according to the present invention for providing a mark to a case of a cartridge of ammunition, the mark comprising at least one sub-mark and being suitable for identification or for tracking of the cartridge, comprises at least one scratching means. The scratching means is configured for selectively incising a surface of the case for thereby forming the at least one sub-mark, the device preferably being configured for carrying out at least one of the above-outlined methods.

It is preferred that the device comprises an actuator which is configured for moving the at least one scratching means between an idle position, in which the scratching means does not interact with the case, and an active position, in which the scratching means interacts with the case such that the at least one sub-mark is formed. The active position of the scratching means is a position in which the scratching means incises into the surface of the case in order to form the sub-mark.

In a preferred embodiment, the active position of the scratching means is variable. This this can be understood as a plurality of active positions which means a plurality of positions to which the scratching means can be moved by the actuator and, in these positions, interacts with the case such that a sub-mark can be formed. Alternatively, the active position of the scratching means being variable can also be understood as a continuous variation of the active position to incise a plurality of different depths of the sub-mark into the case.

In a preferred embodiment, the device comprises a plurality of scratching means which are configured for selectively incising the surface of the case for thereby forming a plurality of sub-marks. The use of a plurality of scratching means makes the device more efficient and allows marking of a case in less time because the plurality of sub-marks can be applied to the case simultaneously.

In a further preferred embodiment, the device comprises a computer system which is configured for controlling the at least one scratching means, preferably a plurality of scratching means, and for positioning the cartridge in order to allow for generating a predetermined mark on the cartridge.

The present method and device and their preferred embodiments as outlined above allow for solving the above-identified problem. In particular, marking a case of a cartridge of ammunition is made possible in a very efficient manner, it being possible to apply the mark to the lateral surface of the case with a high density of information. The mark cannot easily be removed from the cartridge and is resistant to wear.

DETAILED DESCRIPTION OF THE DRAWINGS

Figure 1:
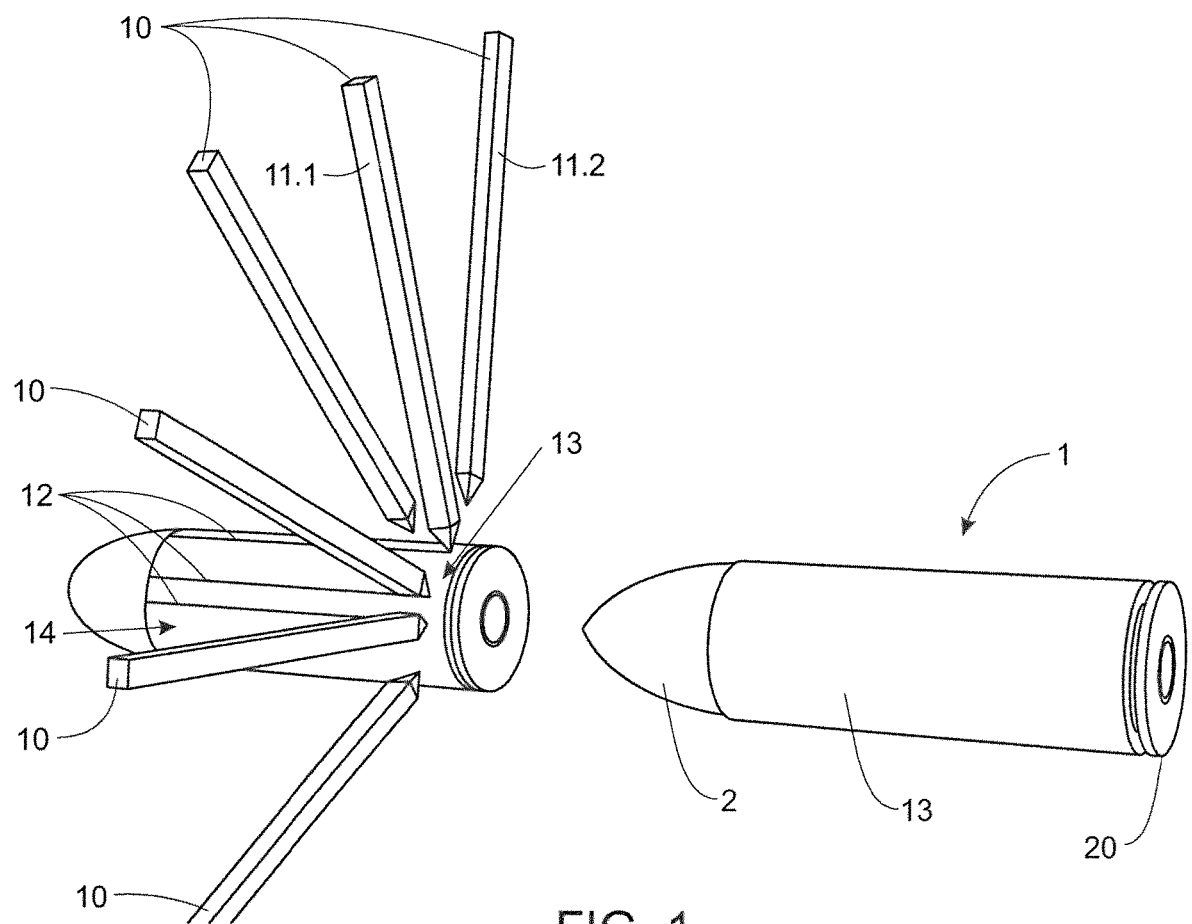
FIG. 1 illustrates a preferred method for providing a mark to a case of a cartridge of ammunition using a plurality of scratching fingers.

FIG. 1 illustrates a preferred method of providing a mark to a case 13 of a cartridge 1 of ammunition. The mark comprises several sub-marks 12. The sub-marks 12 can be, as illustrated in FIG. 1, longitudinal lines on an outer surface of the case 13. A longitudinal line means a line which is oriented substantially parallel to the symmetry axis of the case 13 and the cartridge 1. In other words, the line, which forms the sub-mark 12, extends along the surface of the case 13 from a bottom 20 of the case 13 towards a projectile 2.

A feature of the mark is the existence or non-existence of a sub-mark 12 at a predetermined position. In FIG. 1, reference sign 12 denotes the sub-marks in the form of lines. Reference sign 14 denotes a predetermined position on the case 13 where a sub-mark 12 is not formed. The lack of a sub-mark at position 14 can be identified by a detector and can be part of the information encoded by the mark. As a binary system, the existence or non-existence of a sub-mark 12 at a predetermined position such as position 14 adds to the information encoded by the mark.

In FIG. 1, a plurality of scratching fingers 10 is provided for incising the surface of the case 13. FIG. 1 illustrates active scratching fingers 11.1 and idle scratching fingers 11.2. The active scratching fingers 11.1 interact with the case 13 by incising the surface of the case 13. The idle scratching fingers 11.2 do not interact with the case 13 so that a sub-mark 12 is not applied to the surface at the position of the idle scratching fingers 11.2.

The active scratching fingers 11.1 can incise sub-marks 12 of variable depth into the case 13, stepwise from one depth to another, continuously or using both techniques.

According to the method illustrated in FIG. 1, the cartridge can be conveyed along the scratching fingers 10 and the scratching fingers 10 can be selectively positioned into their idle or active positions to apply a sub-mark 12 or not. The combination of the existence or non-existence of a sub-mark 12 at predetermined positions on the case 13 can then be identified by a detector or even a user to deduce information as to the identity of the cartridge 1. Of course, also other information can be encoded on the cartridge 1 in a way that is durable and, at the same time, inexpensive.

Figure 2:
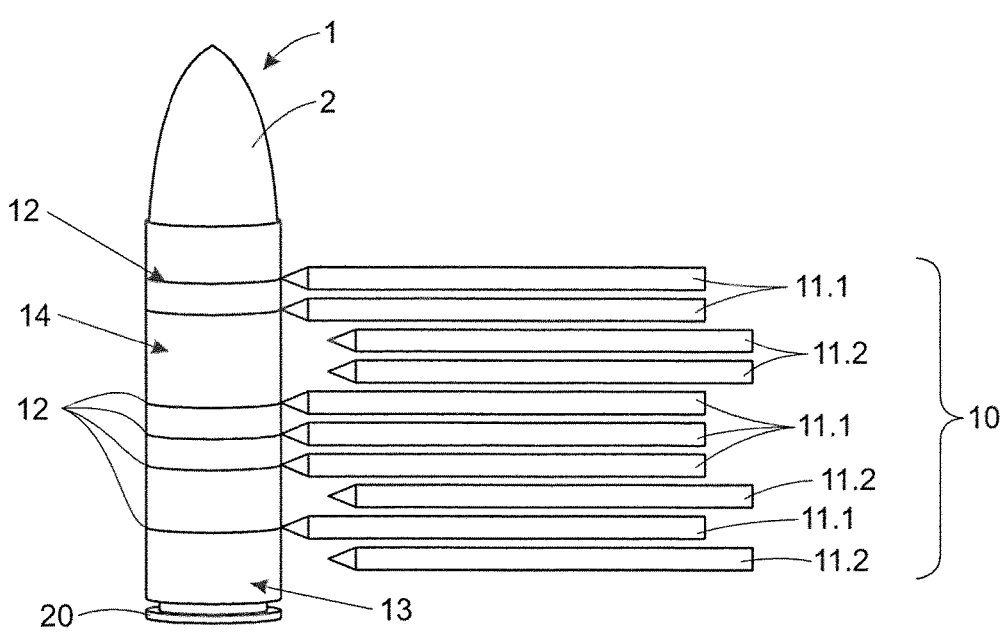
FIG. 2 illustrates another embodiment of a preferred method similar to the method illustrated in FIG. 1.

FIG. 2 illustrates a similar method and the same reference signs used also in FIG. 1 correspond to the same elements in FIG. 2.

In contrast to the method according to FIG. 1, the case 13 of the cartridge 1 is provided with sub-marks 12 not in the form of longitudinal lines but in the form of circumferential lines around the cylindrical circumference of the case 13. In order to incise the sub-marks 12 as illustrated in FIG. 2, the cartridge 1 is not, as in the case of FIG. 1, conveyed along its longitudinal direction during the interaction of at least one of the scratching fingers 10 with the surface of the case 13. Rather, the case 13 is rotated about its symmetry axis along the longitudinal direction of the cartridge 1, while at least one of the scratching fingers 10 incises the surface of the case 13 to apply at least one sub-mark 12. In the example illustrated in FIG. 2, six of the scratching fingers 10 are placed in their active positions so that they are active scratching fingers 11.1, whereas the four remaining scratching fingers 10 are placed in their idle positions so that they are idle scratching fingers 11.2, thereby not forming a sub-mark, such as in position 14.

The mark applied to the cartridge 1, in particular the case 13, can form a code that is readable either visually, using a vision system, or using any sensor system. Also, it is possible that a combination of codes, some of which being recognizable by a user, others only being readably by a detector system, is applied to the case 13 of the cartridge 1. In addition to the lines illustrated in the above-mentioned FIGS. 1 and 2, also sub-marks of other shapes can be applied to the surface of the case 13. Examples for other shapes are spots, scratches, holes, as well as alphanumeric characters. The combination of some or all of these sub-marks forms the mark which allows identification and/or tracking of the cartridge 1.

In the embodiments illustrated in FIGS. 1 and 2 the code is based on the absolute position of sub-marks 12 at predetermined positions on the case 13. In other words, it is detected whether a sub-mark 12 is present at a predetermined position or not. This allows for a binary code capable of encrypting information. However it is also possible to vary the sub-marks in thickness, depth and relative distance to each other in order to increase the amount of information which can be encoded by the mark.

According to a preferred embodiment, a device for realizing the inventive method uses actuators which a capable of moving the scratching fingers 10 between their idle positions in which the respective scratching finger 10 does not interact with the surface of the case 13 and their active positions in which the respective scratching finger 10 does interact with the case 13 by incising into its surface.

Further, it is generally possible that the scratching fingers are movable laterally, i.e. along a circumferential direction of the case and/or its longitudinal direction, in addition to its radial direction along which the scratching fingers can be moved between the idle and active positions. This feature is not restricted to the illustrated embodiments but can generally be applied to any embodiment of the present invention.

Generally, it is possible that the scratching fingers are realized by use of a micro stamping system. Such system is, however, to be dimensioned in a way that the global shape of the case is not deformed upon stamping a sub-mark onto the lateral surface of the case. Further, it is possible that the scratching fingers act on the surface of the case, alternatively to the mechanical way outlined above, by electro-erosion, i.e. by an electrode forming an electrical arc under an applied pulse voltage.

The invention claimed is:

1. Method of providing a mark to a case of a cartridge of ammunition, the mark comprising at least one sub-mark and the mark being suitable for identification or for tracking of the cartridge, the method comprising:
   selectively incising a surface of the case using at least one scratching means in the form of one or more active scratching fingers and one or more idle scratching fingers, thereby forming the at least one sub-mark,
   wherein incising the surface comprises cutting into the surface of the case, thereby removing material from the case,
   wherein a plurality of scratching means selectively incises the case,
   wherein each scratching finger of the at least one scratching means is movable by an actuator between an idle position, in which the scratching finger does not interact with the case, and an active position, in which the scratching finger interacts with the case such that the at least one sub-mark is formed, each scratching finger of the at least one scratching means being movable between the idle position and the active position independently from other scratching fingers of the at least one scratching means.

2. Method of claim 1, wherein the mark comprises a plurality of sub-marks.

3. Method of claim 1, wherein the sub-mark is at least one of a line, a spot, a scratch and a hole, wherein the sub-mark extends longitudinally along the case or circumferentially around the case.

4. Method of claim 1, wherein the mark provides information on the basis of at least one of an absolute position of the at least one sub-mark on the case, a relative position of the at least one sub-mark with respect to at least one further sub-mark, the existence or non-existence of the at least one sub-mark at a predetermined position, a depth of the at least one sub-mark on the case, a width of the at least one sub-mark and a modulation in depth or width of the at least one sub-mark along its principal extension.

5. Method of claim 1, wherein the mark has the form of a standard barcode.

6. Method of claim 1, wherein the at least one scratching means comprises a material which is harder than a material of the case.

7. Method of claim 1, wherein the active position of the scratching means is variable and a depth of the at least one sub-mark on the case is modulated by varying the active position of the scratching means.

8. Method of claim 1, wherein a computer system controls the at least one scratching means and a position of the cartridge in order to generate a predetermined mark on the cartridge.

9. Device for providing a mark to a case of a cartridge of ammunition, the mark comprising at least one sub-mark and the mark being suitable for identification or for tracking of the cartridge,
   the device comprising at least one scratching means in the form of one or more active scratching fingers and one or more idle scratching fingers configured for selectively incising a surface of the case for thereby forming the at least one sub-mark,
   wherein incising the surface comprises cutting into the surface of the case, thereby removing material from the case,
   wherein a plurality of scratching means is configured for selectively incising the surface of the case for thereby forming a plurality of sub-marks,
   wherein each scratching finger of the at least one scratching means is movable by an actuator between an idle position, in which the scratching finger does not interact with the case, and an active position, in which the scratching finger interacts with the case such that the at least one sub-mark is formed, each scratching finger of the at least one scratching means being movable between the idle position and the active position independently from other scratching fingers of the at least one scratching means.

10. Device of claim 9, wherein the device is configured for carrying out a method of providing a mark to a case of a cartridge of ammunition.

11. Device of claim 9, wherein the active position of the scratching means is variable.

12. Device of claim 9, further comprising a computer system which is configured for controlling the at least one scratching means and for positioning the cartridge in order to allow for generating a predetermined mark on the cartridge.

* * * * *